United States Patent [19]

Frankel et al.

[11] 4,051,561

[45] Oct. 4, 1977

[54] STORE AND BURN INCINERATING TOILET AND METHOD

[75] Inventors: Donald P. Frankel, Lake Geneva, Wis.; Willard E. Kendall, Elgin, Ill.; John F. Cooper, Williams Bay, Wis.

[73] Assignee: Lake Geneva A & C Corporation, Lake Geneva, Wis.

[21] Appl. No.: 627,756

[22] Filed: Oct. 31, 1975

[51] Int. Cl.² ............................................. A47K 11/02
[52] U.S. Cl. .......................................... 4/131; 4/118; 110/9 E
[58] Field of Search ............... 4/131, 118, 1; 110/9 E, 110/9 R

[56] References Cited

U.S. PATENT DOCUMENTS

| 3,227,114 | 1/1966 | Anderson | 110/9 R |
|---|---|---|---|
| 3,230,913 | 1/1966 | La Mare | 110/9 |
| 3,320,907 | 5/1967 | Duncan | 110/9 |
| 3,486,174 | 12/1969 | Nordstedt et al. | 4/131 |
| 3,683,425 | 8/1972 | Patterson | 4/131 |
| 3,694,825 | 10/1972 | Kufrin et al. | 4/131 |
| 3,742,874 | 7/1973 | Eff | 4/131 |
| 3,776,152 | 12/1973 | Gill | 4/131 |
| 3,789,434 | 2/1974 | Vollrath | 4/131 |
| 3,827,378 | 8/1974 | Kufrin et al. | 4/131 |
| 3,837,012 | 9/1974 | Rassbach et al. | 4/131 |
| 3,858,251 | 1/1975 | Vollrath et al. | 4/131 |

Primary Examiner—Henry K. Artis
Attorney, Agent, or Firm—Hill, Gross, Simpson, Van Santen, Steadman, Chiara & Simpson

[57] ABSTRACT

A store and burn incinerating toilet has a heat permeable upwardly opening receptacle over a combustion chamber and under a deck providing a toilet seat support and having a receiving opening over the receptacle, the opening being closeable by a removable plug closure when a selectively operable heat producing device in the combustion chamber is in operation. Vapor and products of combustion generated in the receptacle pass from the receptacle into the front portion of the combustion chamber and toward the rear of the chamber and into an afterburner flue stack leading from the rear of the chamber. Preheated air is introduced into the receptacle during the burn cycle, and air is also introduced at the lower end of the stack. While incineration is in progress the closure is locked by a thermally responsive safety-locking device. During the accumulating and storing interval, a layer of masking foam may be applied and maintained over the waste in the receptacle.

32 Claims, 11 Drawing Figures

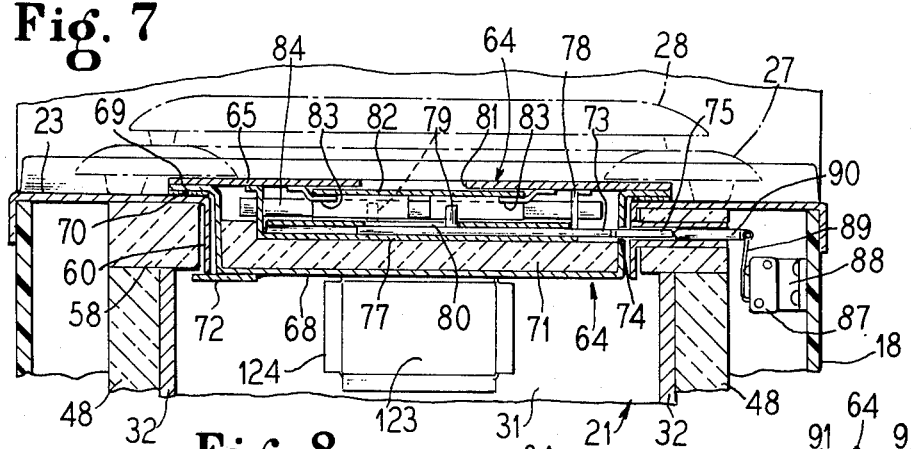
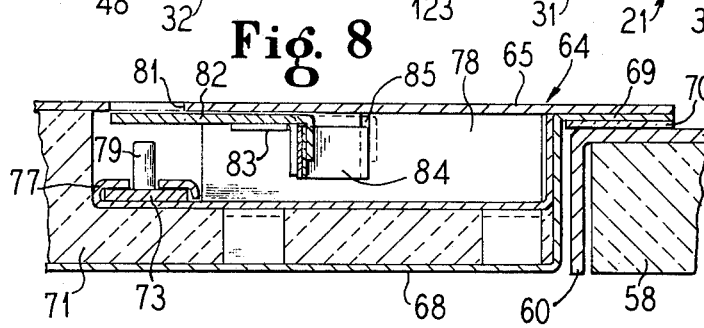
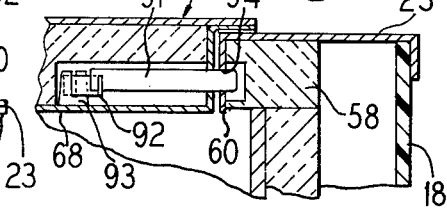
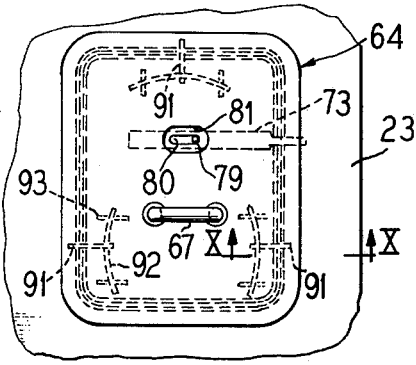
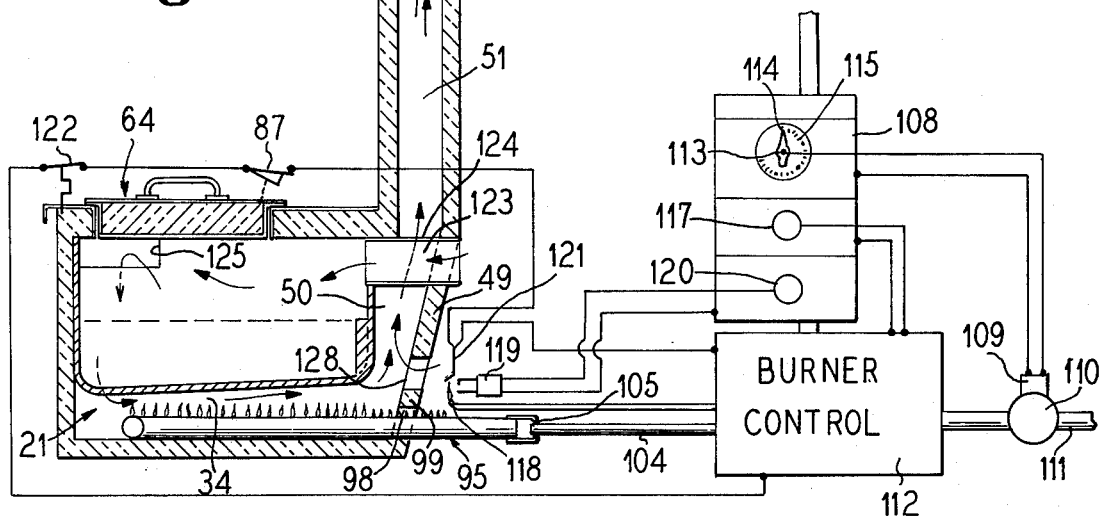

STORE AND BURN INCINERATING TOILET AND METHOD

This invention relates in general to incinerating toilets, and is more particularly concerned with a new and improved store and burn incinerating toilet.

Incinerating toilets are desirable for sanitary waste disposal where flush toilet facilities are impractical or at least not as convenient as an incinerating toilet.

Prior incinerating toilets have generally been of the use and burn type. That is, a burn or incinerating cycle has been initiated after each use, involving substantial fuel expenditure to bring the system up to on the order of 1500° F. The burn cycle may involve a 300 to 1 fuel to air ratio requiring on the order of 100,000 btu's just to heat the air. After a burn cycle, the whole system must be cooled down to a safe temperature for reuse of the appliance. This means that a forced circulation blower is required. Odorous remains may be blown to atmosphere by the required large volume of cooling air. In general, fairly complex electrical controls, including interlocks and safety devices are employed in the operation and control of such incinerator toilets.

It will be appreciated that fuel consumption in such prior incinerating toilets is high, because much of the fuel is consumed merely to bring the system up to incineration temperature and to heat the excess air for each burn cycle. When it is considered that a toilet may be used by an average family of four up to 45 times in a 24 hour interval, it will be readily apparent that there is a real problem in relation to fuel consumption. In addition, there is the problem of delay during periods of heavy traffic due to the necessity of cool-down before reuse, or at least very strong cooling draft which may be objectionable to subsequent users. There is generally a time interval of 3 or 4 hours, at least during a 24 hour day wherein the toilet may stand completely idle.

An important object of the present invention is to provide a new and improved store and burn incinerating toilet which will overcome the disadvantages, deficiencies, inefficiencies, shortcomings and problems in prior incinerating toilets and methods.

Another object of the invention is to provide a new and improved greatly simplified store and burner incinerating toilet in which waste material can be accumulated over an extended period of time and efficiently incinerated in a single incineration cycle.

A further object of the invention is to provide a new and improved low cost, efficient incinerating toilet which will remain odor free during a storing interval, and which will burn with odor free efficiency.

Still another object of the invention is to provide a new and improved incinerating toilet which will operate during the burn cycle with simple line pressure heat producing means such as atmospheric gas burner, and simple convection draft.

Yet another object is to avoid any need for a hopper between the toilet seat and the waste receptacle.

According to features of the invention, plural waste deposits are accumulated and stored in a heat permeable upwardly opening receptacle, the top of which is closed during a burn cycle in which vapors and products of combustion are guided to travel through a combustion chamber under the receptacle and finally subjected to afterburning in a vertical flue stack. Preheated air is introduced into the receptacle during the burn cycle, and additional air to promote combustion is introduced adjacent the entrance to the flue stack. During the burn cycle a safety closure is retained in place over the receptacle. During the accumulation and storage of waste, masking, bacteria-inhibiting foam may be maintained over the waste material in the receptacle. The accumulation of the waste material in the receptacle may be gauged to determine when a sufficient volume has accumulated for optimum incinerating efficiency.

According to additional features of the invention the store and burn incinerating toilet comprises a heat permeable upwardly opening receptacle having upstanding side walls and a bottom wall, heat insulation defining a combustion chamber under the bottom wall, a deck over the receptacle providing a toilet seat support and having a receiving opening over the receptacle, a selectively operable heat producing device disposed in generally rear to front orientation in the combustion chamber under the receptacle, a removable closure for the opening to be applied when the heat producing device is in operation, means compelling vapor and products of combustion generated in the receptacle to pass from the receptacle into the front of the combustion chamber and along the heat producing device toward the rear of the chamber, an afterburner flue stack leading from the rear of the combustion chamber, and means providing an air passage leading into the receptacle and in preheating relation to the combustion chamber. Combustion promoting air port is desirably provided at the lower end of the flue stack. A heat responsive safety interlock may be provided for the closure. The heat producing device is adapted to operate at ordinary line pressure. Odor free combustion is effected in a simple convection combustion system without the excess air customary with powered draft inducing means.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

FIG. 7 is an enlarged fragmentary vertical sectional detail view taken substantially along the line VII—VII in FIG. 6;

FIG. 8 is an enlarged fragmentary sectional elevational detail view taken substantially along the line VIII—VIII in FIG. 6;

FIG. 9 is a more or less schematic fragmentary plan view of a modified deck closure arrangement;

FIG. 10 is an enlarged fragmentary vertical sectional detail view taken substantially along the line X—X of FIG. 9; and FIG. 11 is a schematic view illustrative of operating details and controls for the incinerating toilet.

Figure 1:
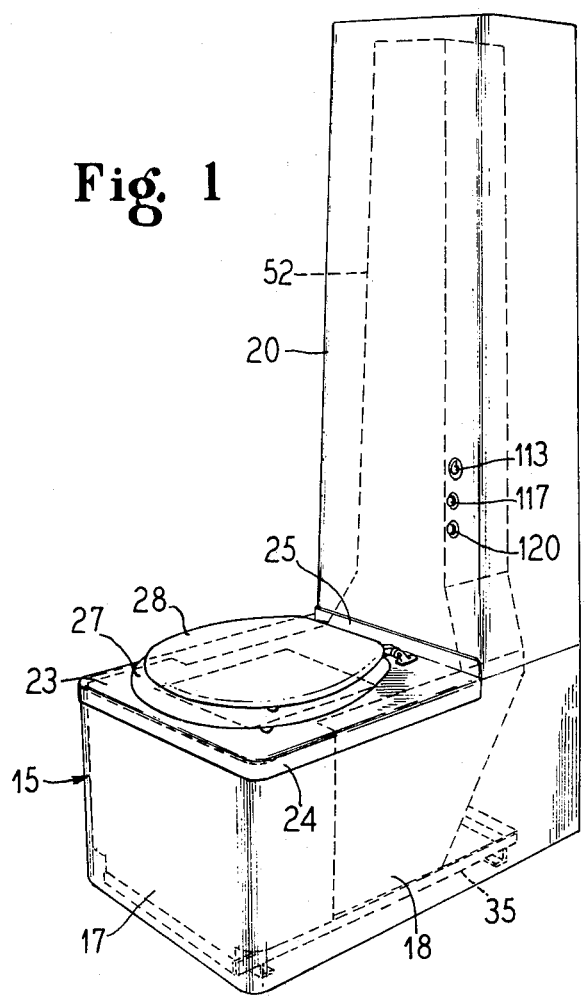
FIG. 1 is a perspective view of an incinerating toilet embodying features of the invention.
Figure 2:
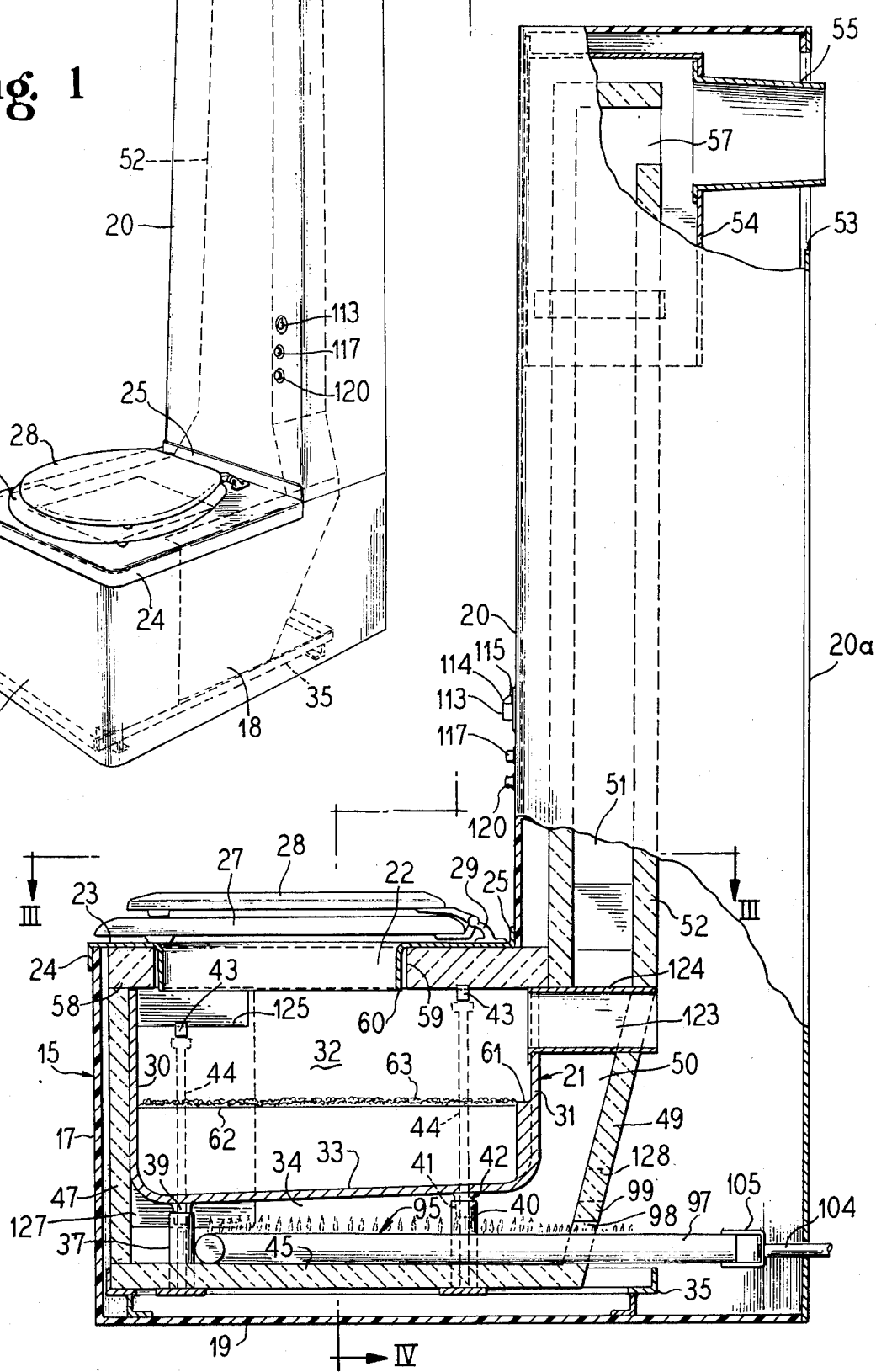
FIG. 2 is a side elevational view of the toilet shown in FIG. 1, with the parts broken away and in section for illustrative purposes.

In a preferred embodiment of a store and burn incinerating toilet according to the present invention and as depicted in FIGS. 1 and 2, enclosing housing cabinet 15 is provided which may be formed from a corrosion resistant, high impact resistant and adequate temperature resistant moldable thermoplastic such as that identified as General Electric Lexan FL900 adapted to be formed by the process generally identified as "TSF" thermoplastic structural forming. The housing includes a front wall 17 opposite side walls 18 and a bottom wall 19. Offset rearwardly relative to the front wall 17 is an upward flue stack enclosing hood 20.

Housed within the cabinet 15 inwardly adjacent to the front wall 17 and between the side walls 18 is a heat permeable upwardly opening receptacle 21 into which deposits are made through an opening 22 in a deck 23 which preferably comprises a formed up sheet metal member such as stainless steel dimensioned complementary to and to be supported upon the upper edges of the front wall 15 and the side walls 18 in front of the lower end of the upwardly elongated hood 20. To maintain the deck member 23 oriented on the housing, a downturned perimeter flange 24 around the front and side edges of the member 23 is fixed about the outer sides of the top edges of the front and side walls of the housing. An upstanding finishing and curb flange 25 on the deck member 23 fits up against the lower end of the front wall of the hood 20. Any suitable means such as screws (not shown) may be employed to retain the deck member 23 in place but permitting removal of the deck member when desired. Supported on the deck member 23, properly oriented with respect to the receiving opening 22 is a toilet seat 27 and a seat cover 28 hingedly secured to the rear portion of the deck member 23 by means of customary hinge brackets structure 29.

Figure 3:
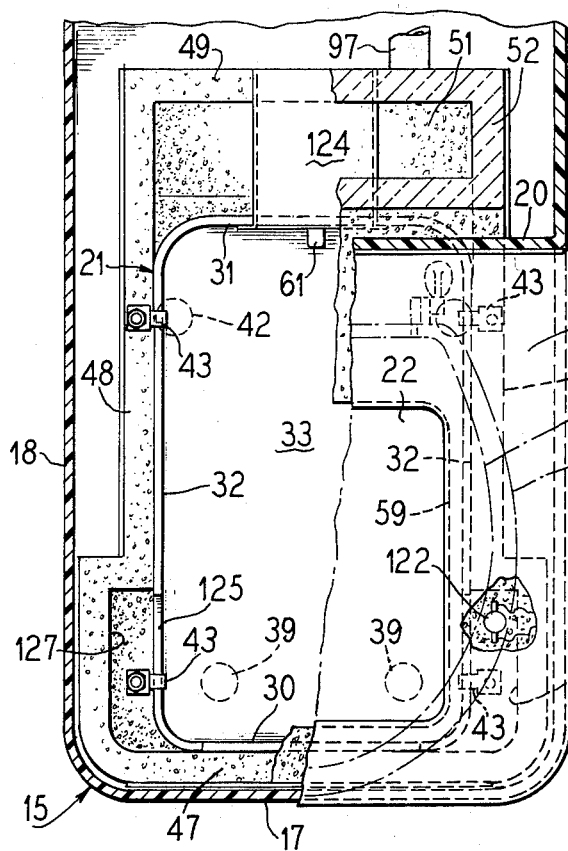
FIG. 3 is a top plan sectional view substantially along line III—III of FIG. 2.
Figure 6:
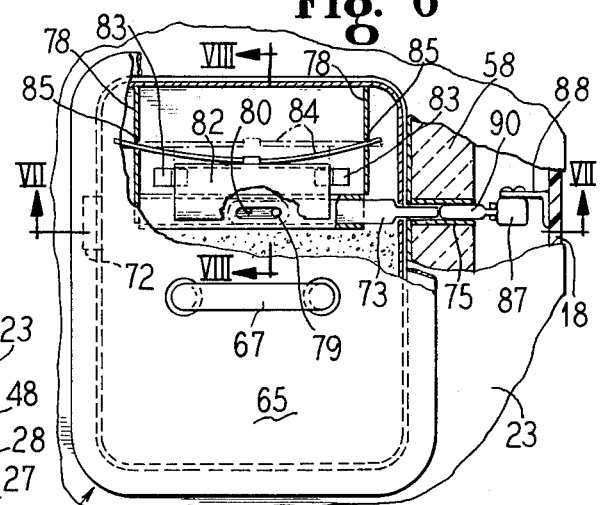
FIG. 6 is a fragmentary top plan view showing the deck port closure, partially broken away and in section for illustrative purposes.
Figure 4:
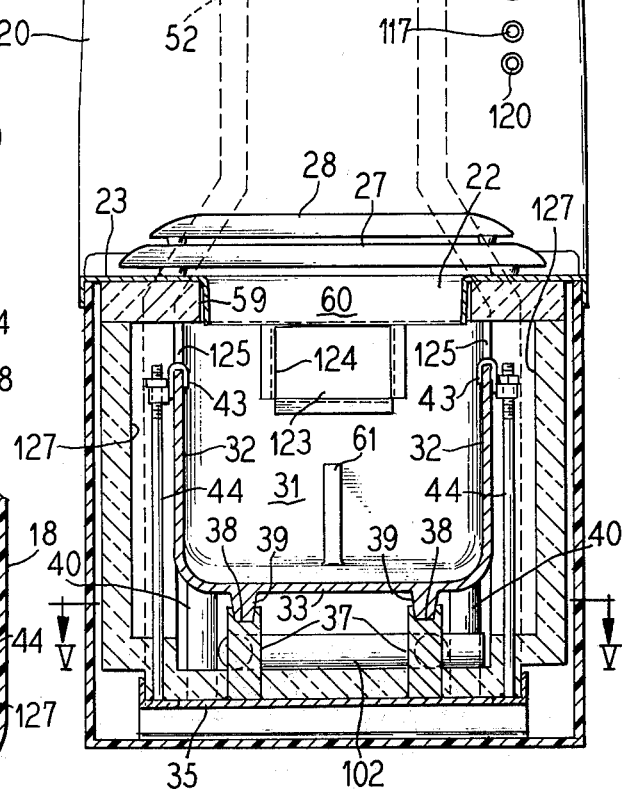
FIG. 4 is a front elevational sectional view taken substantially along the line IV—IV of FIG. 2.

In a preferred construction, the receptacle, which may also sometimes be referred to as a pot or retort is constructed as a cast stainless steel member having a front wall 30, a rear wall 31, opposite side walls 32 (FIGS. 2, 3, and 4) and a bottom wall 33 defining an upwardly opening accumulation chamber of generally front to rear elongated form. The bottom wall 33 slopes downwardly forwardly at a low angle.

To provide for a combustion chamber space 34 under the receptacle 21, means are provided for supporting the receptacle removably in spaced relation above the housing bottom wall 19, and in this instance comprising a metal frame 35 provided with a pair of laterally spaced supporting posts 37 having upwardly opening sockets 38 receptive of downwardly projecting integral boss legs 39 on the bottom wall 33 adjacent to the juncture of the front wall 30 with the side walls 32. An additional pair of laterally spaced upstanding posts 40 on the frame 35 provide upwardly opening sockets 41 receptive of downwardly projecting boss legs 42 on the bottom wall 33 adjacent to juncture of the side walls 32 with the rear wall 31. At suitable longitudinally spaced intervals the tops of the receptacle side walls 32 are engaged by hold down clamps 43 removably attached to the upper ends of upstanding anchor rods 44 carried by the frame 35.

Means defining a combustion chamber in heat transfer relation under the receptacle 21 comprise refractory heat insulation, preferably in the form of fiber ceramic, including a base panel 45 supported by the frame 35, in suitable combustion chamber spaced relation under the bottom wall 33 of the receptacle and in air space relation above the bottom wall 19. An upstanding front insulation panel 47 extends from the base panel 45 in air space relation to the housing front wall 17 and abuts the front wall 30 of the receptacle. Upstanding side insulation panels 48 extend from the base panel 43 and abut the major extent of the receptacle side walls 32 and lie in air space relation to the housing side walls 18. At their rear ends, the side insulation panels 48 join an upwardly and rearwardly oblique insulation panel 49 which is spaced rearwardly from the receptacle rear wall 31 to provide a rear upward extension 50 of the combustion chamber 34 to which the rear wall 31 is exposed in heat transfer relation.

At the upper end of the chamber extension 50 is the entrance into a flue 51 defined by a stack 52 formed from the same refractory heat insulation comprising high melting point (2300° F., 1360° C) ceramic fibers having the capability in the appropriate thickness of the present purpose of about 1 in. (2.5 cm) of attaining incandescence at the surfaces exposed to combustion heat but containing the heat within the combustion spaces and maintaining an acceptably cool outer surface so that conduction cooling air or dead air spaces between the insulation and the housing casing will assure perfectly safe comfortable temperature condition on the outer surfaces of the housing. Heat transfer to the outer surfaces of the housing is further reduced by virtue of the housing being constructed from a poor heat transfer material. A substantially spaced relation is maintained between the stack 52 and the shroud or hood 20, and especially its removable rear wall 20a which extends in closing relation from the bottom wall 19 up to, or at least provides, an inlet opening 53 for entry of combustion and cooling air into the unit. A tubular draft shroud 54 is mounted in spaced relation about the upper portion of the stack 52. At its lower end the draft shroud 54 is open to receive cooling air and its upper end is closed with a laterally extending exhaust port extension. 55 leading therefrom and projecting outwardly through the opening 53 to be coupled to a suitable stove pipe outside of the hood shroud 20 if necessary. Stack bracing means 56 may be carried by the shroud 54 which itself is suitably secured to inner side of the front wall of the hood 20. An exhaust port 57 opens from the upper portion of the stack 52 in alignment with the exhaust port extension 55. Through this arrangement, relatively cool air is drawn through the draft shroud 54 into and reduces the temperature of the clean flue gases issuing through the port 57. It may be observed that the cross-sectional flow area of the port extension 55 is substantially larger than the port 57 whereby to accommodate increased exhaust volume due to cooling air mixed with the exhausting combustion gases.

A thicker layer of refractory insulation 58 is supported across the upper edge of the receptacle 21 under the deck member 23. This insulation layer 58 may be of substantially the same material as the other insulation used to define the combustion chamber 34, 50 and the afterburner flue stack 52 but may be of a more porous or flocculent structure and about 1½ in. (3.71 cm) thick. A port hole 59 in the deck insulation 58 is aligned in slightly spaced relation to a down turned flange 60 of about the same width as the thickness of the insulation 58 and defining the receiving hole in the deck member 23 as well as providing a shield for the port 59 edge of the insulation 58. By having the depending shield or guard flange 60 as narrow as possible, i.e. only as wide as the thickness of the insulation layer 58, and extending substantially straight vertically, contamination likelihood is minimal.

During a service or accumulation or storage interval, the receiving opening 22 is adapted to remain open so that the toilet may be used in the customary manner, and without requiring flushing or burning after each use, until a sufficient accumulation in the receptacle 21 to warrant a burn cycle. For example, a 65 to 70 use load capacity may be provided for, or until the liquids and solids slush volume reaches a predetermined level as may be determined by a gauging device such as a vertical gauging rib (FIGS. 2, 3 and 4) on one wall within the receptacle 21 such as the rear wall 31 and rising from the bottom wall 33 to the maximum gauge height which may be visualized by looking through the opening 22. By way of example the level of waste material 62 is shown in FIG. 2 as close to the top of the gauge rib or column 61 indicating that a burn cycle should be initiated, although as a practical matter the load may be less, or even slightly greater at the time it is conventient to initiate the burn cycle.

During load accumulation, an aesthetically desirable and sanitary covering foam may be applied over the waste material 62. Such foam may be applied in any desirable manner such as by means for automatically injecting in onto the waste, but more economically may be applied manually from a suitable container such as a spray can from time-to-time as required to mask appearance and odor. A fairly stable but heat dispersible foam for this purpose may comprise a fatty acid soap composition including a holding agent such as zinc sulphate, a germicide and perfume. For convenience in application, the foaming compound may be supplied in a dispenser container pressurized by means of a conventional propellant such as aerosol, isobutane, propane or the like.

When it is desired to initiate a burn cycle, a first prerequisite is to place a safety porthole plug closure 64 (FIGS. 6, 7, 8 and 11) into closing and sealing relation to the receiving opening 22. For this purpose, the closure 64 comprises a preferably metal top panel 65 to which is attached a suitable outwardly projecting manipulating handle 67. Secured to the underside of the panel 65 is a generally pan shaped body 68 having its perimeter dimensioned to fit freely within the flange 22. Attachment of the body 68 to the panel 65 is by means of a lateral marginal flange 69 secured to the margin of the panel 65 which is dimensioned to overlap the deck member 23 about the opening 22. A suitable insulating gasket 70 is desirably attached to the underside of the flange 69 to provide a heat seal. Within the chamber provided by the body member 68 is contained suitable heat insulation 71. For retaining the closure against inadvertent displacement, one or more retaining fingers 72 are mounted on the bottom of the body 68 along one side edge to underlie the lower edge of the flange 60, and a latching manually operable slide bolt 73 is mounted within the body 68 to project at its opposite side through a hole 74 into a tubular socket 75 carried by the flange 60 and extending into and through the adjacent portion of the deck insulating panel 58. Support for the bolt 73 is provided by a guide tube 77 mounted by means of a bracket structure 78 suitably spaced under the top panel 65. Slidable manipulation of the bolt 73 is effected by means of an upwardly projecting manipulating handle projection 79 thereon extending through a gauging slot 80 of a length to limit retracted position of the bolt 73 with its outer end in clearance relation to the hole 74 and an opposite limit wherein the locking terminal of the bolt is at a suitable projected telescoped position within the socket 75. Access to the manipulating handle projection 79 through the top panel 65 is by way of an access opening 81 above the slot 80.

As a safeguard against opening the closure 65 after a burn cycle has progressed to a dangerous heat level within the receptacle 21, means comprising a heat responsive interlock are provided, conveniently comprising a safety closure plate 82 slidably supported as by means of brackets 83 on the underside of the top panel 65 normally adjacent to one side, herein the rear side of the access opening 81 and in clearance relation thereto, but heat responsively movable into blocking closing relation to the access opening 81. Heat responsive motivation of the plate 82 is effected by means of a bimetallic strip 84 centrally attached to the rear edge of the plate 82 and having its opposite end portions projecting freely slidably through respective apertures 85 in the bracket members 78. At room temperature, the bimetallic actuator 84 maintains the plate 82 in retracted position as indicated in dash outline in FIG. 6. When the temperature within the receptacle 21 reaches a predetermined degree such as about 200° F (81° C) the plate 82 will be moved by action of the bimetallic actuator 84 into fully interlocked position as shown in full outline in FIG. 6. This locked position will persist until the unit is cooled down to a safe temperature permitting the actuator to retract the plate 82.

In addition to its latching function, the bolt 73 serves to operate burner control circuit safety control means in the form of a normally open lock out switch 87 suitably mounted on a bracket 88 carried by the housing side wall 18 adjacent to the interlock socket tube 75. The switch 87 may be of a microswitch type provided with a spring actuating arm 89 having its distal end connected in suitably articulated relation to the outer end of an actuating plunger 90 which extends into the tubular socket guide 75 to be engaged by and projected toward the switch actuating arm 89 in the latching position of the bolt 73 and to be retracted by action of the spring arm 89 when the bolt 73 is withdrawn. As a result, the burner operating circuit will be automatically opened when the latch bolt 73 is retracted and will be automatically closed when the latch bolt is thrown into latching position.

In a modified arrangement as shown in FIGS. 9 and 10, function of the latch bolt 73 and its actuation may be the same as already described. However, instead of the safety locking or closure plate 82, the closure plug 64 may carry a plurality of automatically heat responsive interlock bolts 91 each of which is connected to a bimetallic strip actuator 92 mounted on brackets 93 carried by the upper surface of the closure body 68. Desirably there are three of the interlock bolts 91, one of each of which is located at each opposite side and at the rear of the closure member 64 and projectable from the respective side by action of the heat responsive actuator 92 to extend lockingly into a locking aperture 94 in the depending deck flange 60. Through this arrangement opening of the closure 64 can be effected only when the bolts 91 are retracted, even though the bolt 73 may be pretracted and the burner control circuit opened before the toilet unit has cooled down to a safe temperature.

Figure 5:
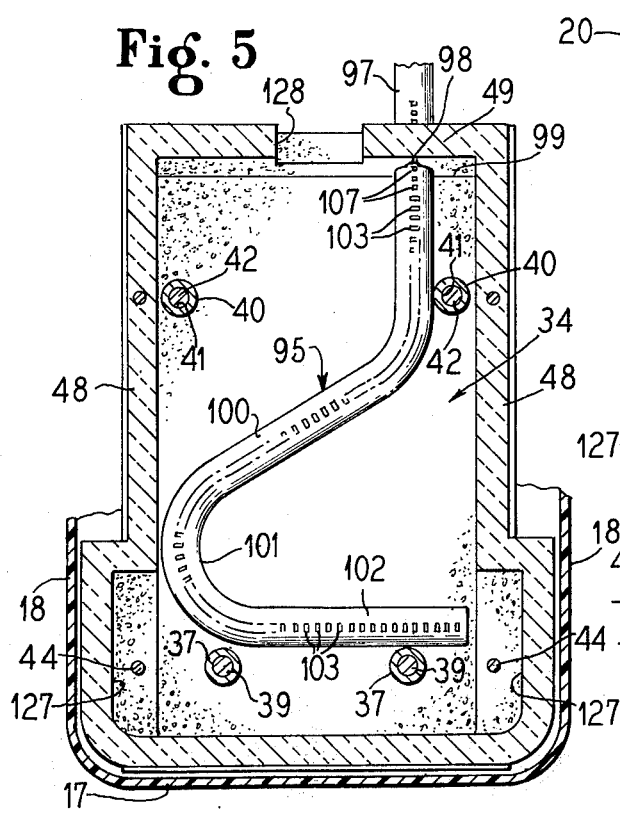
FIG. 5 is a horizontal sectional detail view taken substantially along the line V—V in FIG. 4.

To effect incineration of the waste 62 accumulated in the receptacle 21 incinerating heat is applied thereto within the combustion chamber 34 and its extension 50. A selectively operable heat producing device in this instance in the form of a gas burner 95 is disposed in the combustion chamber under the receptacle 21 and adapted to heat the bottom of the receptacle in substantially the manner of heating a cooking pot. In a preferred form, the burner 95 is of the so-called atmospheric burner type operating quietly at ordinary line pressure and comprises simply a hollow tube supported on the base insulation panel 45 with an outer end portion 97 extending outwardly through a generally upwardly elongated key hole slot 98 in a removable access door section 98 in the lower portion of the rear insulating panel 49 and adjacent to one side (FIGS. 2 and 5). For maximum incinerating flame production in a simple and efficient geometric configuration, the burner 95 is of a generally sinuous form having a generally diagonal section 100 extending obliquely from the inner end of the straight section 97 generally forwardly and from one side toward the opposite side under the bottom wall 33 of the receptacle 21 and joining a returned and curved section 101 leading into an elongated inner terminal transverse section 102 underlying the front portion of the bottom wall 33 at the deepest portion of the receptacle 21, that is where the deepest accumulation of slush waste is concentrated. Along the top of the tubular burner 95 is an array of flame orifices 103 of preferably equal size and in uniformly spaced series. At its inner end the burner is closed and at its outer end it is open and has coupled thereto the delivery end of a gas feeding duct 104 as by means of a generally U-shaped air gap spider 105 which maintains the delivery end concentric with the open receiving end of the burner section 97. In the portion of the burner section 97 which extends through the opening 98, a series of ignition flame orifices 107 leads to the start of the series of larger flame orifices 103. In a desirable arrangement, the number of flame orifices 103 in the extent from the inner end of the series of ignition orifices 107 to the center of the curved section 101 may be sufficient to generate about 32,500 BTU's in full operation of the burner, and the number of orifices 103 from the center of the section 101 to the end of the section 102 may be sufficient to produce about 22,500 BTU's, for a total of about 55,000 BTU's, adequate for complete incineration of an about 45 use load in about 1½ hours, or a 65–70 use load in about 3 hours.

Means for controlling operation of the burner 95 comprise a simple electro-mechanical structure and circuit, best visualized in FIGS. 1, 2, 4 and 11. A timer 108 is electrically coupled with a valve actuator 109 which may include a solenoid for controlling a gas control valve 110 in a gas supply line 111 connected through a burner control unit 112 with the delivery duct 104. As a first step, of course, the closure plug 64 must be placed in closing position and the interlock switch 87 closed. Then the burner can be started by activating the timer 108 manually by turning a knob 113 until a pointer 114 thereon is set to the desired burn interval calibrated on a dial 115. This effects opening of the gas valve 110 which will be automatically closed when the timer runs out the set time interval. Opening of the valve 110 supplies the burner control. Then a pilot light switch button 117 is pressed to activate the burner control to supply a pilot light nozzle 118 with gas while a piezo electric pilot igniter 119 is activated by pressing in a control switch button 120. The pilot light switch button 117 is held in until a thermo-couple 121 is heated to activate the burner control to couple the gas delivery duct 104 with the supply conduit 111 to activate the burner 95 which will ignite from the pilot light through the ignition orifices 107 whereby the gas issuing through the flame orifices 103 is ignited. A suitably located normally closed thermally responsive safety switch 122 will open and stop the burn cycle if the temperature within the unit becomes excessive due to any possible malfunction or if the timer 108 has been set to maintain the burn cycle longer than necessary for complete incineration of the particular load.

Primary combustion air is, of course, supplied directly to the burner 195 at the spider 105. A greater volume of secondary combustion air is supplied through an air passage 123 in preheating relation to the combustion chamber, and more particularly the combustion chamber extension 50 by way of a duct 124 opening to atmosphere at the rear of the unit and communicating with the interior of the receptacle 21 through the upper portion of the rear wall 31. This secondary combustion air carries boiled off vapor from the receptacle 21 through means which will compel the vapor and any products of combustion generated in the receptacle to pass into the combustion chamber 34 and along the heat producing device, that is the burner 95, toward the flue 51. For this purpose the upper front portions of the receptacle side walls 32 have respective escape openings 125 which open into down draft passages 127 (FIGS. 3, 4 and 5) defined by respective offsets in the front portions of the insulation panels 48 and in cooperation with the front end portions of the receptacle side walls 32 below the spillover or escape ports 125. At their lower ends, the down draft passages 127 communicate with the front end portion of the combustion chamber 34 in the vicinity of the burner section 102 and forwardly from the burner sections 100 and 97. Conduction draft established by operation of the burner 95 causes the secondary combustion air drawn in through the passage 123 to sweep heat vaporized waste material from the receptacle 21 and through the ports 125 and passages 127 into the front end portion of the combustion chamber 34 and along the burner 95 across the rows of flames issuing from the ports 103 interposed in the path of movement of the convection current stream. The secondary air substantially promotes intensity of combustion and assures maximum conversion of the waste material into primary gaseous constituents. On reaching the combustion chamber extension 50, tertiary combustion air is supplied through inlet means such as a port or ports 128 in the lower portion of the back wall 49 and desirably immediately above the access panel portion 99. The air thus supplied plus whatever air may leak in through the burner clearance opening 98 intensifies combustion and improves convection draft toward and into the flue 51. Maximum efficiency is attained by having the inlet means 128 centered as low as practical at the entrance to the combustion chamber extension 50 and centered below the secondary air duct 124 which is located in the uppermost portion of the combustion chamber extension 50 where maximum secondary combustion air heating advantage is attained. It will be appreciated that as the combustion heat progresses upwardly during the burn cycle, resulting in proportionate increase in the convection velocity, substantially proportionate rate of secondary combustion air preheating is of substantial advantage in accelerating the rate of heat conversion of the waste materials in the receptacle 21.

A further important advantage of intensification of combustion in the combustion chamber extension 50 resides in the carryover afterburner effect in the flue 51. As a result of the intense combustion activity, the inner surfaces of the refractory stack 52 become incandescent and the upwardly flowing stream is subjected to intense reflected heat which completes reduction of any unburned constituents that may escape the combustion chamber. Upon reaching the discharge port 57 at the top of the stack, the effluent is in the form of odorless gas.

During progression of the burn cycle, there is initially boiling and driving off of the liquid waste. Inasmuch as the normal ratio of solids to liquid in toilet waste is in the range of one to four or one to six or about one pound of solids to four to six quarts of liquid there is a fairly prolonged interval of boiling in the receptacle 21 during a burn cycle during which there is a breaking down of the solids into a slurry of minutely sub-divided particles. Upon reaching a dry state, the solid waste reaches a flash point and there is then combustion directly in the receptacle 21 until the solid waste is entirely consumed. Such combustion is promoted and of improved efficiency due to the finely divided particulate nature of the solids resulting from the boiling.

According to automatic recorder performance chart statistics, during a burn cycle for incineration of the receptacle contents, there is a rapid initial increase in operating temperatures which is important to avoid stack exit odors at the start. About 1200° F (648.5° C) is reached very quickly, thus giving excellent odor control. The various parameters, including gas supply, flame orifice number and arrangement, primary, secondary and tertiary air supplies, location of the receptacle 21 relative to the burner 95, combustion chamber size and arrangement, afterburner flue length, and incandescence areas of the refractory liner, all contribute to attain a substantially uniform, stable result. As evaporation of the liquid waste increases, increased convection draws cooling air into the system, maintaining a fairly stable temperature which, if anything, decreases slightly during maximum boil-off. However, the combustion rate is readily controlled by adjustment of the fuel delivery to maintain the temperature sufficiently high to avoid stack exit odor. Therefore, during boil-off there is little temperature change and the system operates in a substantially stable condition. After evaporation is completed, and the solid combustible wastes have heated to their flash or ignition temperature, they ignite, but this does not appreciably raise the temperature in the system beyond an initial slight surge as ignition occurs. As the additional heat from the ignited waste material is added to the burner heat input, increased convection velocity causes increased air inflow through the secondary and tertiary inlets, wherein the secondary air inlet affords a generous air supply, and the tertiary inlet an ample but desirably more modulated air supply, maintaining a substantially uniform combustion temperature in the system without the necessity of modulating the fuel delivery to the burner 95. For example, efficient results are obtained where the cross-sectional flow area of the secondary air passage 123 is about 10 in$^2$ (65 cm$^2$), and the tertiary air inlet 128 is of a cross-sectional flow area of about 4 sq. in$^2$ (28 cm$^2$). In such a unit a desirable length for the flue 51 is about 37.25 in. (94.6 cm), with a cross-sectional flow area of about 15 sq. in$^2$ (97.5 cm$^2$).

If by the time all of the waste material has been burned out of the receptacle 21, the timer 108 has not run out and stopped the burn cycle, slight elevation of temperature in the unit will be detected by the safety switch 122 which will open and break the burner control circuit and stop the burn cycle. Thereupon, latent heat in the system will continue the convection circulation so that air drawn in through the secondary air inlet 123 and the tertiary air inlet 128 will accelerate cooldown. Then, when the heat sensitive, bimetallically actuated safety interlocks for the closure 64 have returned to inactive position, the closure can be removed from the receiving opening 22 and the toilet unit returned to active use.

An important advantage for compactness and economy as well as utility resides in the elimination of any need for a hopper to funnel waste material from the opening 22 into the receptacle 21. This eliminates a fault of most waterless type toilets and also the water washed conventional toilet hoppers which become unsanitary and often are contaminated with dry wastes or wastes that stubbornly adhere in spite of cleansing efforts. Herein the upper edges of the receptacle walls are contiguous the underside of the deck insulation panel 58 and the vertically extending deck flange 60 is merely a stiffening and insulation protecting guard flange defining the opening 22 and is virtually free from susceptibility of soiling. Surfaces within the receptacle 21 are automatically cleansed during the burning cycle. In this connection the front wall 30 serves an important function as a splash guard in avoiding, for example, urine contamination of the front insulation panel 47 which is thereby guarded against degredation from organic salts which would tend to destroy insulative qualities of the insulation. Although the side escape ports 125 are in the forwardmost portions of the side wall 32, these ports are located sufficiently laterally of the opening 22 and are high enough to avoid splash escape therethrough.

A valuable attribute of the fiber ceramic insulation directly exposed to the combustion chamber and the afterburner stack is that not only does it provide a highly efficient, lightweight refractory insulation, but because of its relatively rough surface, increased surface area is provided for incandescent radiation. Another advantageous feature of this insulation is that the relatively rough surfaces causes turbulent flow in the boundary layer as contrasted to laminar flow, which apparently improves mixing of the vapors and burning gases with the hottest combustion zone region toward the center of the combustion flow path or passageway through the unit, thereby contributing to the burn cycle efficiency.

It will be understood that variations and modifications may be effected without departing from the spirit and scope of the novel concepts of this invention.

We claim as our invention:

1. A store and burn incinerating toilet, comprising:
   a housing;
   a heat permeable upwardly opening receptacle of substantial capacity within the housing;
   said receptacle being of a size adapting it to receive and accumulate and store waste from a plurality of successive uses of the toilet;
   means within the housing defining a combustion chamber in heat transfer relation under said receptacle;
   a deck on said housing having a receiving opening over the top of said receptacle and aligned with the upward opening into the receptacle and through which receiving opening waste is adapted to be deposited in said receptacle;
   said deck providing a toilet seat support;

a selectively operable heat producing device disposed in said combustion chamber under said receptacle and adapted to heat said receptacle in substantially the manner of heating a cooking pot, but being inoperative while said receiving opening is open to receive waste therethrough for deposit in said receptacle;

a removable closure for said receiving opening to be applied in closing relation to said receiving opening when said heat producing device is to operate;

said heat producing device being operable after the closure has been placed in closing relation to said receiving opening to heat said receptacle and effect substantial boiling and incineration of the stored waste by means of heat permeating from said combustion chamber through at least the bottom of the receptacle from the combustion chamber;

means providing an air passage in preheating relation to said combustion chamber and leading into said receptacle;

an afterburner flue leading from the combustion chamber; and means compelling vapor and products of combustion generated in said receptacle to pass into said combustion chamber and to travel toward the flue and thereby causing the vapor and products of combustion to pass through the heat produced by the heat producing device in the combustion chamber.

2. An incinerating toilet according to claim 1, including a supporting structure within said housing separably supporting said receptacle over said combustion chamber.

3. An incinerating toilet according to claim 2, including separable hold-down clamping means carried by said supporting structure and engaging upper edges of said receptacle.

4. An incinerating toilet according to claim 1, including load gauging means in and forming part of said receptacle.

5. An incinerating toilet according to claim 1, wherein said means defining the combustion chamber comprises lightweight high melting point ceramic fiber refractory material directly exposed to the interior of the chamber, and said afterburner flue having a passage defined by a stack of said refractory material directly exposed within the passage.

6. An incinerating toilet according to claim 5, wherein said housing encloses the refractory material in air space relation.

7. An incinerating toilet according to claim 5, including a hood enclosing said refractory material stack in air space relation, an exhaust port at the upper end of said stack, and means for effecting air cooling at the upper portion of said stack and providing an exhaust flue port communicating with said exhaust port.

8. An incinerating toilet according to claim 1, wherein said heat producing device comprises a tubular atmospheric gas burner of sinuous form located in the bottom of said combustion chamber and having an array of flame orifices to direct flame upwardly toward the receptacle, portions of the burner extending transversely, said means compelling the vapor and products of combustion to pass into the combustion chamber being located at a front end of said receptacle, and said flue extending from the combustion chamber adjacent a rear end of the receptacle, whereby vapor and products of combustion must pass through the flame from said orifices in traveling from front to rear through said combustion chamber under said receptacle.

9. An incinerating toilet according to claim 1, wherein said combustion chamber includes an upward extension leading to said afterburner flue contiguous to one end of and in heat transfer relation to the receptacle.

10. An incinerating toilet according to claim 9, wherein said means providing an air passage comprises a tubular air inlet extending through said combustion chamber extension.

11. An incinerating toilet according to claim 10, including means for supplying additional combustion air into said extension of the combustion chamber.

12. An incinerating toilet according to claim 1, wherein said deck includes an underlying insulation layer of predetermined thickness and a metal deck top having a flange extending into said opening and of a width not substantially greater than said insulation.

13. An incinerating toilet according to claim 12, wherein said removable closure extends into said flange, and interlock means engageable with said flange to retain the closure in position.

14. An incinerating toilet according to claim 1, wherein said removable closure includes means interlocking with said deck and preventing removal of the closure while the heat producing device is in operation.

15. An incinerating toilet according to claim 1, including means for controlling operation of said heat producing device and comprising a timer, and a safety device preventing operation of the heat producing device unless said closure is in closing relation to said opening.

16. An incinerating toilet according to claim 1, wherein said heat producing device comprises a gas burner, means for supplying gas to the burner including a burner control, a timer adapted to be set to control timing control of operation of the burner through said burner control, means for effecting ignition of the burner when the timer has been set for operation of the burner control, a safety switch preventing operation of the burner control to supply gas to the burner unless said closure is in closing position relative to said opening, and a heat detector switch for disabling the burner through said burner control when excessive heat is detected adjacent to said deck.

17. An incinerating toilet according to claim 1, wherein said receiving opening opens directly into the top of said receptacle, without intervening waste directing means the upper edge of the receptacle being closely adjacent to said deck.

18. An incinerating toilet according to claim 17, wherein said receptacle has a front wall serving as a splash guard located forwardly relative to said receiving opening.

19. An incinerating toilet including a seat deck having a receiving opening, and comprising:
a receptacle opening upwardly in alignment with said opening and having upright walls with upper edge means close to said deck whereby to receive waste material directly into the receptacle without need for any hopper means;
means for effecting vaporization and combustion of the waste material received in said receptacle;
means for closing said opening during vaporization and combustion of the waste material in the receptacle;

and means providing a passage for leading the vaporized material and combustion gases from the receptacle.

20. An incinerating toilet according to claim 19, wherein said means for effecting vaporization and combustion include a combustion chamber under the receptacle, and said means providing a passage including a port opening through a wall of the receptacle and a path for vaporized material and combustion gases from said port to said combustion chamber.

21. An incinerating toilet including a receptacle for receiving waste therein and means for effecting vaporization and burning of the waste in said receptacle, comprising:
  a combustion chamber;
  means for conducting a stream of vapor and combustion gases from the receptacle through said combustion chamber;
  and a means lining said combustion chamber comprising high melting point fiber ceramic insulation having relatively rough incandescing surfaces directly exposed to the combustion chamber whereby to provide incandescent radiation of the stream and to effect turbulence in the stream at the boundary layer along the surfaces.

22. An incinerating toilet according to claim 21, including an afterburner stack communicating with said combustion chamber to receive said stream, said stack comprising said fiber ceramic insulation directly exposed to the stream.

23. An incinerator toilet according to claim 1, wherein said heat producing device is operative to effect boiling of liquid in the waste in the receptacle and thereby breaking down waste solids into a slurry whereby to promote combustion in the receptacle when the solids reach sufficient dryness to attain the flash point.

24. An incinerator toilet according to claim 1, including an aesthetically desirable and sanitary masking foam over toilet waste received in said receptacle.

25. Apparatus for incinerating toilet waste, comprising:
  a heat permeable upwardly opening storage receptacle for receiving and containing waste from a plurality of uses of the toilet;
  a combustion chamber under the bottom of said receptacle;
  means in said combustion chamber for applying combustion heat directly to and through the bottom of said receptacle substantially in the manner of the application of heat to a cooking pot whereby to effect boiling and combustion of the stored waste;
  an insulated enclosure about said receptacle and combustion chamber and having an opening through which waste is adapted to be deposited in said receptacle through its upward opening;
  means for closing said enclosure opening during operation of said combustion heat applying means;
  an afterburner flue leading from the combustion chamber;
  means for supplying preheated air into said receptacle; and
  means compelling vapor and products of combustion generated by said heat in said receptacle to pass into said combustion chamber under said receptacle and through the combustion heat and into said afterburner flue.

26. Apparatus according to claim 25, wherein said means for applying combustion heat comprise an array of atmospheric gas burner flame orifices, directed toward said receptacle bottom and said compelling means causing the vapor and products of combustion to pass through the flames from said orifices.

27. Apparatus according to claim 25, including a stack formed from incandescing material and defining the afterburner flue, and said material being adapted to become incandescent due to the combustion heat generated in said combustion chamber and passing to the stack to thereby assure total conversion into innocuous gas of all vapor and products of combustion passing through the stack.

28. Apparatus according to claim 25, including means for supplying additional combustion promoting air into the combustion chamber adjacent to the afterburner flue.

29. Apparatus according to claim 25, wherein said afterburner flue extends vertically, and means for effecting cooling of an upper end portion of the flue and for mixing cooling air with flue gases discharged from the flue.

30. Apparatus according to claim 25, comprising means for supplying primary combustion air and gas to said means for applying combustion heat, said means for supplying said preheated air being oriented to supply said preheated air as secondary combustion air, and means supplying tertiary combustion air into the combustion chamber adjacent to passage of the vapor and products of combustion into the afterburner flue.

31. Apparatus according to claim 25, wherein said combustion heat applying means are operable to effect boiling of the toilet waste in the receptacle for a substantial period of time in a vapor driving off phase during incineration to thereby break down solids in the waste into a slurry to promote combustion of the solids in the receptacle when the solids have dried out from application of the combustion heat.

32. Apparatus according to claim 25, wherein the receptacle is of a size to accumulate a large volume of toilet waste therein prior to applying the combustion heat under the receptacle, and an aesthetically desirable and sanitary masking foam covering the waste in the receptacle.

* * * * *